Oct. 16, 1928.

D. L. CHANDLER 1,687,712

TOASTER

Filed May 27, 1927 2 Sheets-Sheet 1

Inventor
Daniel L. Chandler
By Macleod, Calver, Copeland & Dike
Attorneys

Oct. 16, 1928.

D. L. CHANDLER

TOASTER

Filed May 27, 1927      2 Sheets-Sheet 2

1,687,712

Inventor
Daniel L. Chandler
By Macleod, Calver, Copeland & Dike
Attorneys

Patented Oct. 16, 1928.

1,687,712

UNITED STATES PATENT OFFICE.

DANIEL L. CHANDLER, OF BOSTON, MASSACHUSETTS, ASSIGNOR TO CHAMP ELECTRICAL COMPANY, OF BOSTON, MASSACHUSETTS, A CORPORATION OF MASSACHUSETTS.

TOASTER.

Application filed May 27, 1927. Serial No. 194,795.

The invention relates to an improvement in toasters for bread and the like. It is especially intended for application to electric toasters but is not necessarily limited to toasters of that type.

The invention relates more particularly to the holders for the bread while being toasted and to the holders for the toasting elements.

In order to obtain a uniform exposure of the entire surface of the slice of bread to the toasting elements, it is important that all parts be maintained at a uniform distance from the toasting elements and it is also desirable to provide means to maintain the same spacing at all times so that the operator will know just how long to leave the bread in the toaster to obtain uniform results.

One object of the present invention is to provide a holder adapted to be used with slices of bread of varying thickness and which will always hold the bread at a uniform position with relation to the heating or toasting elements regardless of the thickness of the slice. Preferably the toast is held spaced somewhat away from the toasting elements so that it will not be so likely to burn. One object of the invention is to maintain the slices of whatever thickness in uniform relation to the heating element whether it is desired to hold it in contact therewith or in slightly spaced relation thereto.

Another object of the invention is to provide a simple latching mechanism for maintaining the holder in its set position for toasting and which may be readily operated to release the holder from its latched position.

The invention will be more fully understood from the the following description when taken in connection with the accompanying drawings and the novel features thereof will be pointed out and clearly defined in the claims at the close of this specification.

Figure 4:
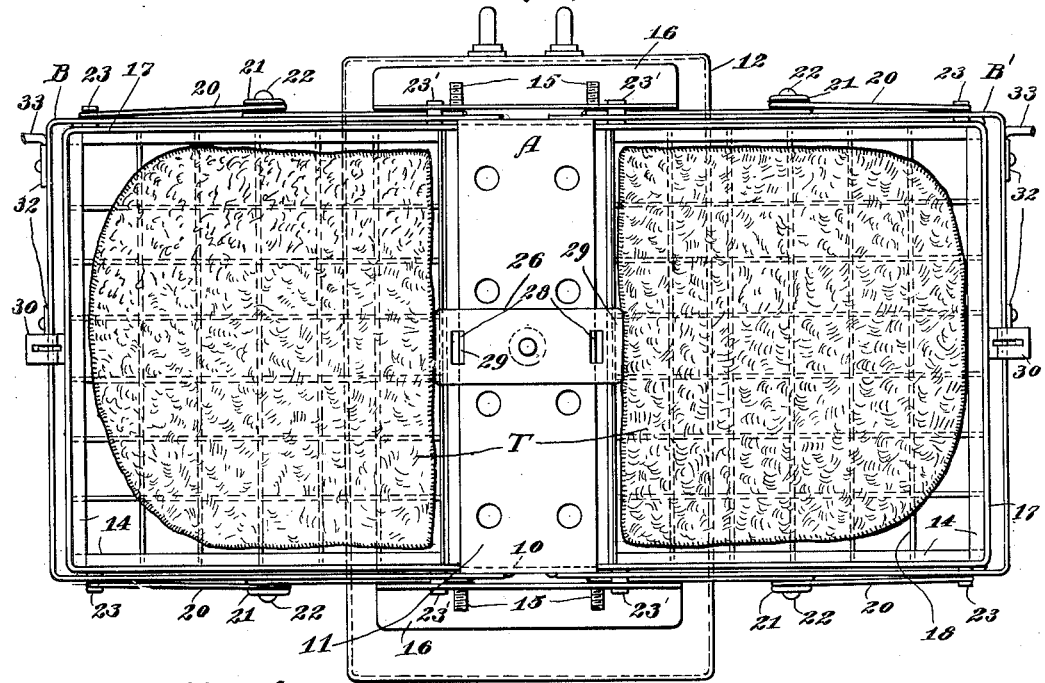
Fig. 4 is a plan view showing the two movable toast holders turned down into position for inserting or removing slices of bread.
Figure 5:
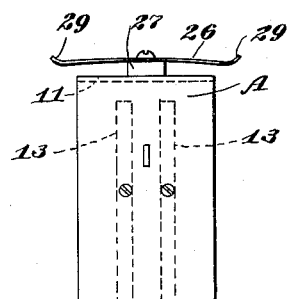
Fig. 5 is a side elevation similar to Fig. 1, but showing the movable holders turned down as in Fig. 4.
Figure 5:
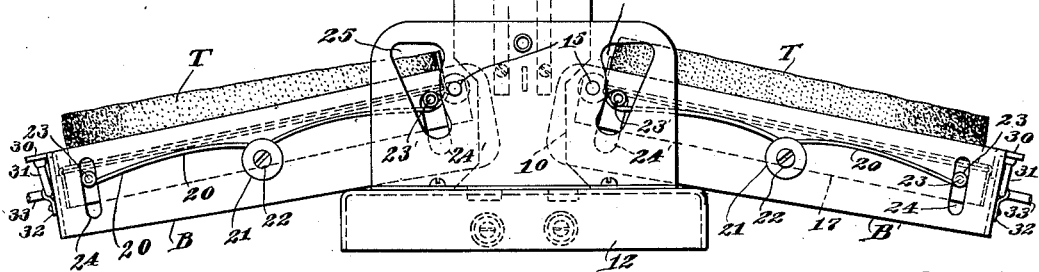

Referring to the drawings, there is shown at A the frame for the stationary heating or toasting element and at opposite sides of said frame A are the two movable frame members B, B' hinged at their lower ends so that they may be turned down as shown in Figs. 4 and 5 or turned up into vertical position parallel with the intermediate member A.

Each of the members B, B' has mounted therein a heating element as will be hereinafter described.

The said intermediate member A comprises two vertical end walls or legs 10, 10 and a top connecting cross bar 11. Preferably this entire frame member A is formed of a single flat piece of sheet steel bent into inverted U-shape to form the top 11 and the two side legs 10, 10. Said member A is mounted upon a base 12.

A toasting element 13 preferably consisting of electric heating coils is mounted in and supported by the member A. Said heating element may be of any suitable type. As shown in the drawings and as preferred, it consists of a series of electric heating coils 13. Guards 14, 14 preferably of open wire work are provided at opposite sides of the series of heating coils 13 and spaced a short distance away therefrom and in planes parallel therewith. These guards are mounted fast in the frame A so that they will always be at the same distance from the heating coils.

Each of the hinged frames B, B' for holding the movable toasting elements is preferably of inverted U-shape similar to the intermediate frame A. Each member B, B' is hinged at its lower end to a fixed support. Any suitable hinge may be employed. As shown in the drawings, each leg of the members B, B' has a hinge pin 15 which projects laterally therefrom and is journalled in a bracket 16 rising from the base 12. By reason of said hinged arrangement each member B, B' may be turned on its hinge from the normal closed position shown in Figs. 1 and 2 down into the substantially horizontal position shown in Figs. 4 and 5.

A movable holder 17 for the heating elements is mounted in each of the hinged members B, B' and has secured thereto a series of heating coils 13. Guards 18 preferably of open wire work similar to the guards 14, 14 are mounted in the holders 17 at a fixed distance from the heating elements so that when a slice of bread is in the toaster, it will be held out of direct contact with the heating coils whatever may be the position of the said holder 17.

Each holder 17 has a ledge or shelf 19 at its lower end on which the lower edge of a slice of bread T may rest during the toasting. This shelf is shown as consisting of a portion of the guard 18 bent at a right angle to the plane of the main portion of the guard.

Figures 1, 2:
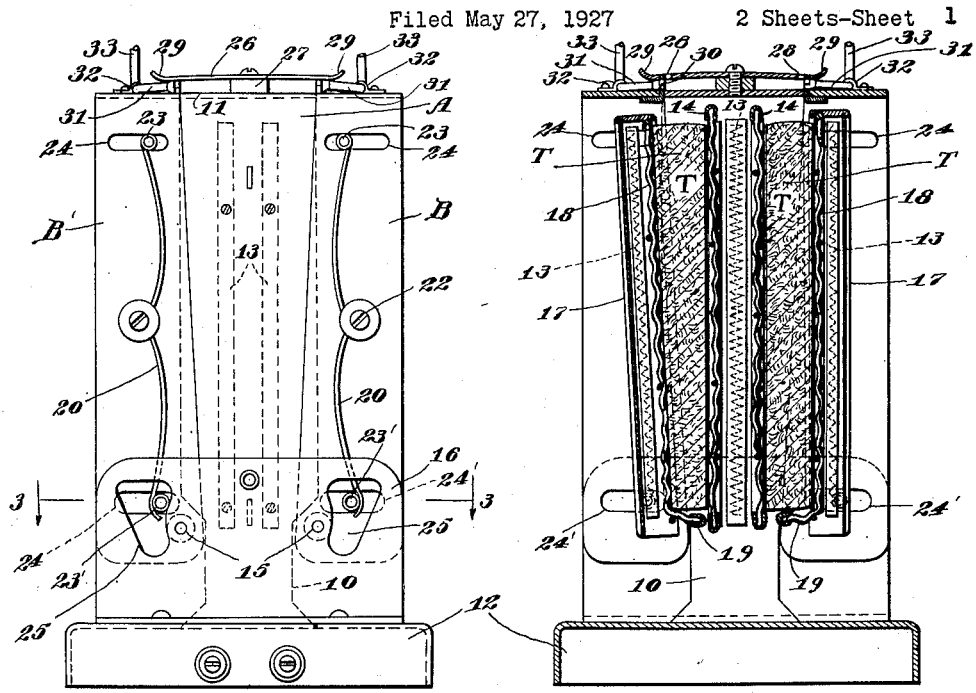
Fig. 1 is a side elevation of a device embodying the invention adapted for toasting two slices of bread at the same time and having one intermediate fixed toast holder and toasting elements and two hinged toast holders with accompanying toasting elements on opposite sides of the intermediate holder.
Fig. 2 is a vertical section of the device showing within the toaster slices of bread whose faces incline toward each other from the upper edge to the lower edge.
Figure 3:
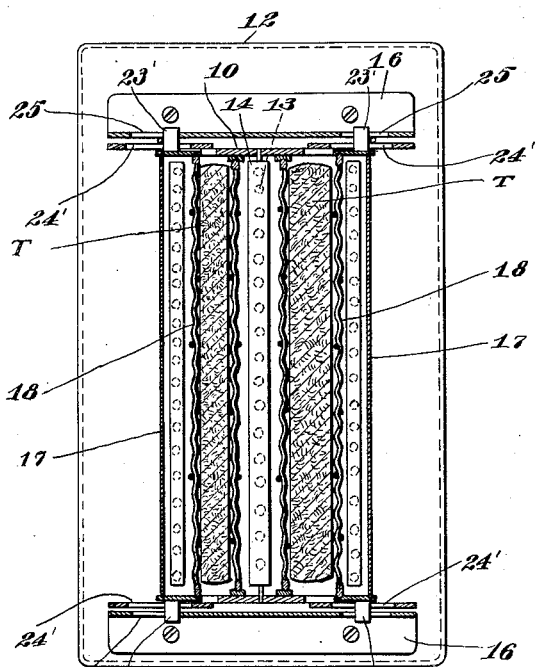
Fig. 3 is a section on the line 3—3, Fig. 1.

Each holder 17 is spring seated in such a manner that it is movable bodily toward and from the stationary guard 14 connected with the intermediate holder A and is also capable of being tilted on either the upper or lower edge so that it may be inclined with relation to the intermediate holder as shown in Fig. 2 with the top part spaced farther away than the lower part or it may be inclined so that the lower part is spaced farther away than the upper part.

This is to accommodate not only slices of bread of greater or less uniform thickness throughout or to accommodate slices which are thicker at one edge than at the opposite edge, that is sort of wedge-shaped.

Springs 20 are provided to make the spring seat. As shown in the drawings there are two springs 20 one at each of two opposite sides of the holder. Each spring consists of a spring wire formed with a loop or coil 21 intermediate its ends, said loop being coiled around a stud 22 which projects from one of the legs of the hinged frames B, B' respectively. Said stud 22 is fast to the frame. Thus the said spring has two arms extending from the said stud 22. The outer ends of said spring arms are respectively engaged by pins 23, 23' which project from the movable coil holder frame 17 and which respectively extend through the elongated slots 24, 24' in the frames B, B'. Said pins 23, 23' hold the springs under tension. The said springs normally maintain the pins at that end of the slots 24, 24' which is nearest to the toast holder guards in the intermediate frame A, when the hinged frame members B, B' are in upright or closed position as in Fig. 1. By reason of the intermediate portion of the spring being held in fixed position by the studs or pins 22 the two arms of the spring act independently of each other as if they were separate springs. The holder 17 may be moved as a whole against the pressure of the springs 20 to increase the distance between the holder 17 and the guard 14 of the intermediate heater or it may be rocked on either the upper pair of pins 23 or the lower pair of pins 23' as a pivot to bring either the bottom or the top edge of the holder 17 farther away from the intermediate guard than the other edge.

The springs cause the guard 18 to press the slice of bread which is in the holder against the fixed guard of the intermediate coil. Said springs will yield to admit slices of different thickness but will press the slice against the guard so that the face of all slices will always be at the same distance from the heating elements.

The bracket 16 in which the movable holders are pivoted is formed with slots 25 through which the pins 23' extend, said slots being of a shape to permit the pins 23' to move in the arc of a circle during the turning of the holder 17 on the hinge pin 15.

Means are provided for latching each of the hinged holder frames B, B' in the closed position. The preferred means is as follows:

A keeper plate 26 consisting of a strip of spring sheet metal is mounted on a block 27 secured to the top of the intermediate frame member A and extends transversely of said frame member. The ends of said keeper strip project free to some distance beyond the block 27 and beyond the edges of the intermediate frame A. The said strip is formed with slots 28, 28 near its opposite ends. The free ends of the strip 26 are turned slightly upward as shown at 29. Mounted on the top of each movable frame member B, B' is an upwardly extending latch or hook member 30 which engages with one of the keeper slots 28 in the strip 26 when the hinged frame members are closed.

A lever 31 is provided on the top of each hinged member B, B' for use in turning the said members B, B' on their hinges. As shown, the lever 31 consists of a rod fastened by brackets or straps 32, 32 to the top of the frame and having a bell crank handle portion 33 at its outer end. When the said lever is operated to turn the said lever B, or B' downward the turned up end portion 29 of the keeper will yield to allow the latch 30 to be released from the slot and also when the hinge member is turned up again into closed position, the spring keeper will yield to allow the latch to ride under the keeper plate until the latch is in alinement with the slot when it will snap into locked position.

The heating coils may be heated in any suitable way. Preferably they consist of resistance coils in an electric circuit not shown as the particular form of heating coil and the manner in which it is electrified does not form a part of the invention.

While the machine shown and described is provided with one fixed toast holder and two movable holders together with the toasting elements so that two slices of bread can be toasted at the same time, it is obvious that a device having only one movable and one fixed holder would embody the invention.

What I claim is:

1. A bread toaster having two sets of toasting elements mounted respectively in holders one of which is movable toward and from the other, an open work guard mounted in each holder in front of its toasting element to space the bread from the toasting element, the movable holder being adapted to be so positioned that a slice of bread may be clamped between the two guards in fixed relation to the two sets of toasting elements, the toasting element and the guard in the movable holder being spring seated, the guard and mount for the heating element within the movable holder being pivoted in such manner that when the movable holder is brought into operative relation to the fixed holder the movable guard and toasting element are permitted to be in a plane at an angle to the plane of the fixed guard and heating element to accommodate slices which are thicker on one edge than on the other edge.

2. A toasting device having two heating elements for toasting, each of said heating elements being mounted in a holder one of which is movable toward and from the other, means for holding a slice of bread between the said two toasting elements, means whereby slices of different thicknesses may be held in the same position relative to the toasting element, and means to lock the movable holder in engagement with the fixed holder when the movable holder is brought into operative relation to the fixed holder, said lock comprising a keeper member composed of spring sheet metal attached to the fixed member and having a slot therein and a latch member mounted on the movable member adapted to engage with said slot.

3. A toasting device having two heating elements for toasting, each of said heating elements being mounted in a holder one of which is movable toward and from the other, means for holding a slice of bread between the said two toasting elements, means whereby slices of different thicknesses may be held in the same position relative to the toasting element, means to lock the movable holder in engagement with the fixed holder when the movable holder is brought into operative relation to the fixed holder, said lock comprising a slotted keeper member composed of spring sheet metal attached to the fixed member, a latch member mounted on the movable member adapted to engage with said keeper, and a handle whereby the movable member may be actuated.

4. A toasting device having two heater elements between which a slice of bread is to be held to toast both sides of the slice at the same time, a hinged holder for one of said heater members, said holder being hinged at one edge to a support, a spring on which said holder is seated, said spring being secured intermediate its ends to said holder, thereby providing oppositely extending arms which may be flexed on opposite sides of said intermediate holding point independently of each other, the outer ends of said spring arms being movable.

5. A toasting device having two heater elements between which a slice of bread is to be held to toast both sides of the slice at the same time, a hinged holder for one of said heater members, said holder being hinged at one edge to a support, a spring on which said holder is seated, said spring being secured intermediate its ends to said holder, thereby providing oppositely extending arms which may be flexed on opposite sides of said intermediate holding point independently of each other, the outer ends of said spring arms being movable and engaged by studs which project from said holder, and a frame having elongated guide slots through which said studs extend.

6. A toasting device having a fixed toasting element, a hinged holder for a second toasting member, a spring seat in said second holder for the bread to be toasted, said spring having an eye intermediate its ends, a stud projecting from said holder through said eye, the portion of the spring on opposite sides of said stud forming two oppositely extending free arms which are independently flexible, a frame in which said holder is mounted, studs projecting from said holder, the ends of the said spring arms being secured to said studs, and said frame being formed with slots through which said studs extend.

7. A toasting device having a holder for a heater member and for a slice of bread adjacent said heater member, a wire spring secured intermediate its ends to said heater holder, the oppositely extending portions of said spring forming arms on opposite sides of said securing point, said spring forming a seat for a heater member, a heater member mounted thereon, said arms being adapted to be flexed independently of each other.

8. A bread toasting device having two toasting elements between which a slice of bread may be held for toasting, a holder for each of said toasting elements, a hinged frame in which one of said holders is mounted, a spring on which said holder is seated, said spring being fixedly secured intermediate its ends to said frame, the portions of the spring on opposite sides of said holding point forming independently yielding arms to accommodate wedge shaped slices.

9. A bread toasting device having two toasting elements between which a slice of bread may be held for toasting, a holder for each of said toasting elements, a hinged frame in which one of said holders is mounted, a spring on which said holder is seated, said spring being fixedly secured intermediate its ends to said frame, the portions of the spring on opposite sides of said holding point forming independently yielding arms to accommodate wedge shaped slices, the ends of said spring arms being secured to studs which extend through elongated slots in said frame whereby the holder and all parts of the surface of a slice which is to be subjected to the fixed heating element will be held at uniform distance therefrom.

10. A toasting device having two heater elements between which a slice of bread may be held for toasting, a hinged holder for one of said heater elements, said holder being hinged at one edge to permit its being turned into operative relation to the other toasting element, a spring seat for said movable heater element mounted in said holder, said spring seat being secured at a point intermediate its ends leaving its end portions free to be flexed independently of each other.

11. A toasting apparatus having two toasting elements one of which is fixed and the other of which is movable toward said fixed toasting element, a holder for said movable toasting element and for the slice of bread to be toasted, said holder being hinged at one edge and adapted to be turned on its hinge to bring a slice of bread held therein into the zone of the fixed toasting element, a spring for said holder which is yieldable bodily to accommodate slices of bread of different thicknesses, said spring seat being also yieldable independently at two opposite edges to allow for slices which are thicker at one edge than at the opposite edge.

12. A toasting device having a fixed toasting element, a hinged carrier for a toast holder, a toast holder mounted in said carrier, a spring seat for the toast in said holder, said spring seat being formed with branches which are yieldable independently of each other whereby a slice which is of greater thickness at one edge than at the opposite edge may have all parts of the surface which are to be toasted presented equally to the toasting element.

13. A toasting apparatus having a fixed toasting member, a carrier movable with relation to said toasting member, a holder for the bread to be toasted mounted in said carrier and movable therewith to bring it into operative position with relation to said fixed toasting member, said holder being seated upon a spring which permits the said holder to yield bodily to accommodate slices of bread of different thicknesses, said spring having portions which are independently yieldable whereby one portion may yield more than another portion to accommodate a wedge shaped slice.

14. A toasting apparatus having a holder for a slice of bread to be toasted, said holder having a spring seat for the bread which is bodily yieldable for the entire slice, said spring having independently yieldable portions whereby one portion of the spring seat may yield in greater degree than another portion to accommodate a slice in which one edge is thicker than the opposite edge.

In testimony whereof I affix my signature.

DANIEL L. CHANDLER.